United States Patent Office 3,423,612
Patented Jan. 21, 1969

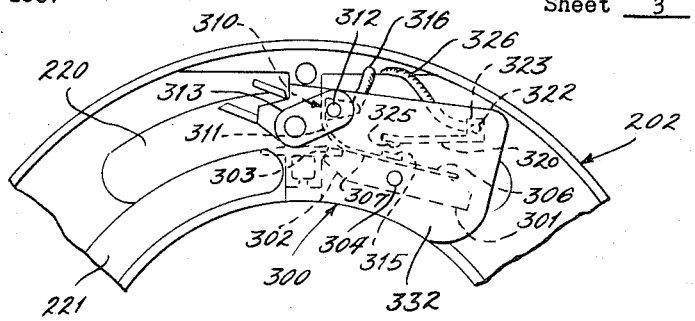
FIG. 5
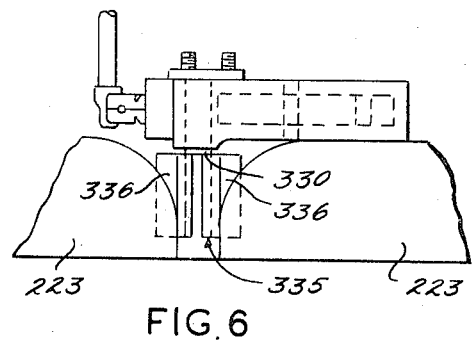
FIG. 6
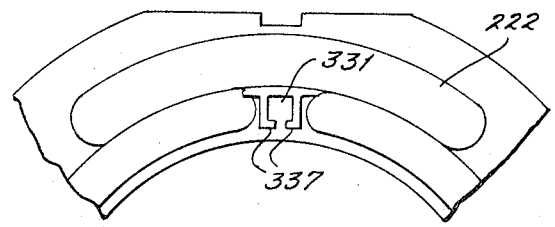
FIG. 7

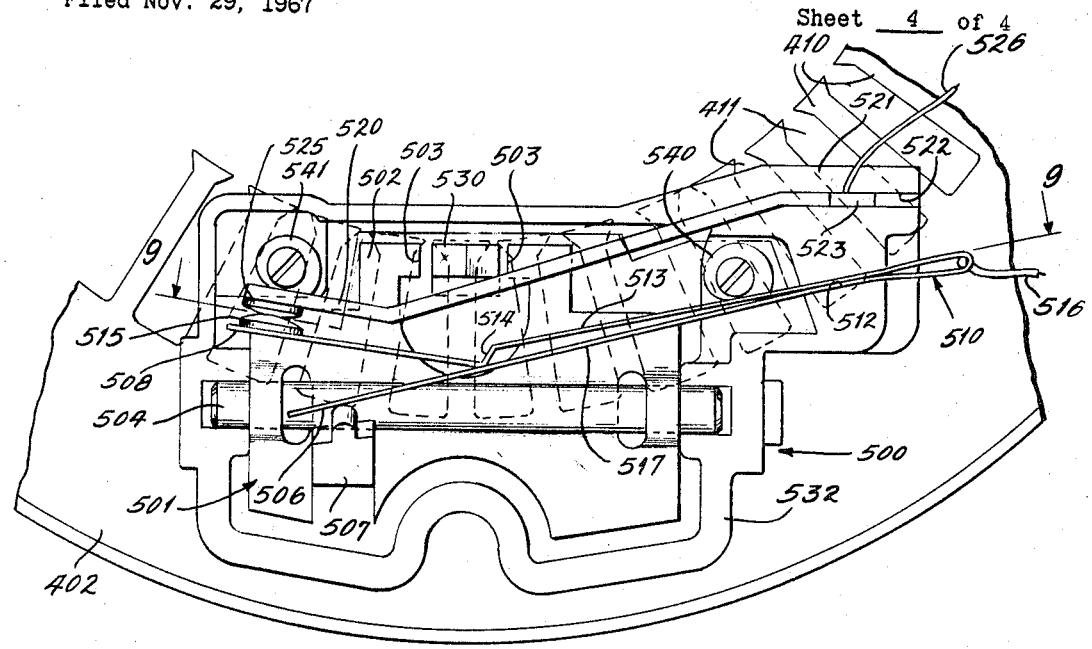
FIG.8
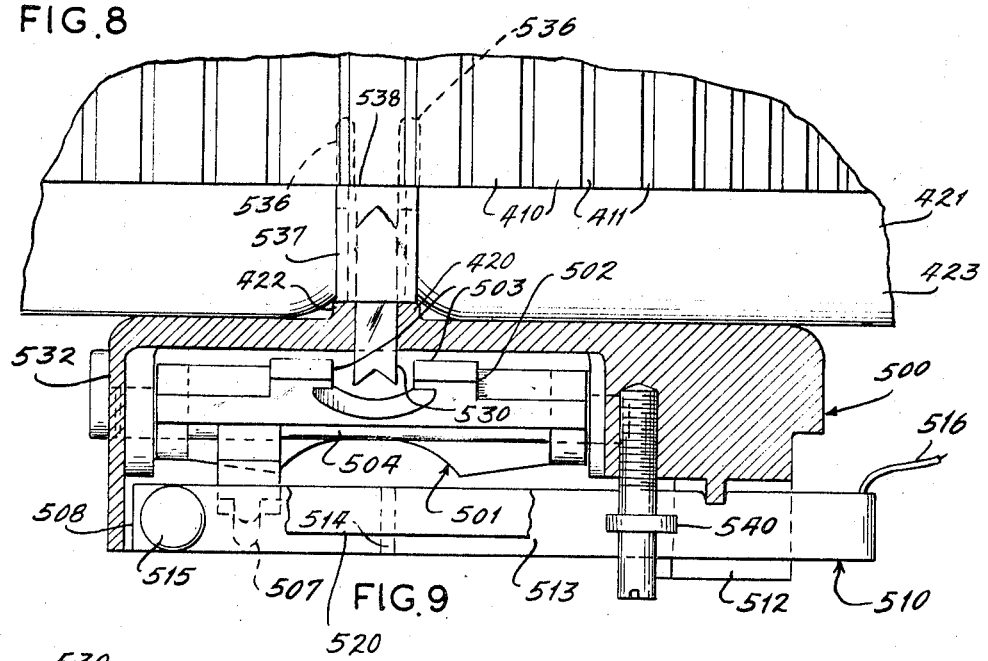
FIG.9
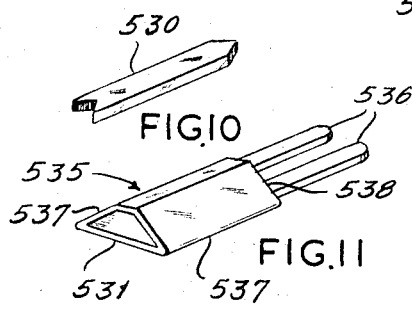
FIG.10
FIG.11
INVENTOR:
RICHARD B. BRUNDAGE
BY
Attorney.

3,423,612
MOTOR STARTING DEVICE
Richard B. Brundage, 2 Whitfield Lane,
Ladue, Mo. 64758
Continuation-in-part of application Ser. No. 457,432,
May 20, 1965. This application Nov. 29, 1967, Ser.
No. 686,598
U.S. Cl. 310—68     11 Claims
Int. Cl. H02k 7/10

ABSTRACT OF THE DISCLOSURE

In an electric motor with a wound stator, a flux collecting probe projecting axially to a point closely adjacent the stator core face and radially within the compass of the end turns. A magnetic piece mounted adjacent the flux collecting probe for movement in response to the generation of a magnetic field in the probe. One fixed electrical contact and another electrical contact mounted on a spring, the spring positioned to bias the magnetic piece away from its direction of movement in response to the magnetic field, and the spring-mounted contact arranged to be moved to circuit making engagement with the fixed contact when the magnetic piece is moved in response to the generation in the flux collecting probe of a strong magnetic field. The contacts, magnetic piece and spring are part of a starting switch to energize start windings during initial starting conditions and to de-energize the start winding under running conditions, the bias of the spring being insufficient to prevent movement of the magnetic piece under initial start conditions but sufficient to move the magnetic piece under running conditions.

Cross reference to related application

This application is a continuation-in-part of my copending application Ser. No. 457,432 filed May 20, 1065.

Background of the invention

This invention relates to electric motors having a wound stator and a rotor. It has particular application to a starting switch for a split phase or capacitor start motor, but the usefulness of the device and method of this invention is by no means confined to these particular illustrative applications of them.

In motors in which there is a starting and a running winding, some means has had to be provided for supplying power to the starting windings when the motor was started, and disconnecting the starting windings from the line when the motor had reached some desired fraction of its normal running speed.

All sorts of devices have been used. The most common one now in use is a centrifugal switch, mounted on the rotor shaft, for rotation therewith. This type of switch has required a rather complicated mechanical linkage, and a sliding bearing contact between the centrifugal actuator and the rest of the switch. Another, less common, type has been what amounts to an external solenoid switch, connected in series with the motor windings, and located externally of the motor housing. Still another form of starting device has been essentially a timer arrangement. The disadvantage of the solenoid is that it requires an extra winding and more space, both of which contribute expense. One disadvantage of the timer arrangement is that it acts independently of the actual condition of the motor, i.e., it does not sense the speed which the rotor has attained. Another disadvantage of a timer arrangement is the need for reset time after motor shut-off.

Still another arrangement is described in Egle, United States Patent No. 3,116,430. In the Egle device, flux generated in the yoke section of the stator core is utilized to operate a switch. The Egle device requires that the yoke section be especially formed to provide increased magnetic flux in a portion thereof, and necessitates the positioning of the switching device between the yoke and the stator housing.

One of the objects of this invention is to provide a device for establishing desired starting conditions, which can be mounted within the motor housing, requires little space, is inexpensive to produce, quiet, reliable, effective, durable and simple.

Another object of this invention is to provide such a device which can be installed in motors of existing design.

Another object of this invention is to provide a method of establishing starting and running conditions, in a simple manner, which, at the same time, is related to the condition of the motor with respect to it speed and load.

Other objects will become apparent to those skilled in the art in the light of the following description and accompanying drawings.

Summary of the invention

In the preferred embodiments of this invention, flux focusing means are provided, in a motor having main and auxiliary windings, positioned within the compass of end turns of a wound stator. A movable piece of magnetic material responsive to the magnetic flux developed in the flux focusing means by the passage of current in the main windings when the motor is being started is positioned with at least one end adjacent the flux focusing means. The moving magnetic piece takes the form of a bar pivoted at its center. The bar is arranged to rotate an end toward and away from the flux focusing means and is continuously biased in a direction away from the means. The bar is arranged to close a switch to energize the auxiliary windings when it is in its flux-responsive position and to open the switch to disconnect the starting windings from the line when it is in its normally biased position. The strength of the biasing force is sufficient to overcome the bar-moving force of the magnetic field from the flux focusing means under running conditions.

In the particular preferred embodiments shown and described, the biasing means is a spring which serves as an electrical conductor and a carrier of an electrical contact point as well.

In the first of the preferred embodiments shown and described, the bar is pivoted between two spaced flux focusing probes. Both ends of the bar approach an adjacent probe closely in response to the generation of a strong magnetic flux in the probes, and are biased in a direction away from their respective probes.

In two other embodiments shown and described, particularly adapted for use in motors in which the flux density is strong, as in a two-pole motor, but not confined in their utility thereto, a single flux focusing element is provided.

The flux focusing probes of the preferred embodiments are positioned within the radial compass of the end turns of the stator coils.

Brief description of the drawing

In the drawing,

FIGURE 5 is a fragmentary view in front elevation showing another embodiment of the starting device of this invention;

FIGURE 6 is a fragmentary view, radially outwardly, of the device of FIGURE 5, with lead wires attached;

FIGURE 7 is a fragmentary view in front elevation showing a pick-up support of the device shown in FIGURES 5 and 6;

FIGURE 8 is a fragmentary view in front elevation showing another embodiment of the starting device of this invention, with its cover removed;

FIGURE 9 is a fragmentary sectional view taken along the line 9—9 of FIGURE 8;

FIGURE 10 is a view in perspective of a flux focusing probe for use in the embodiment of starting device of this invention shown in FIGURES 8 and 9; and FIGURE 11 is a view in perspective of a support for holding the probe shown in FIGURE 10.

*Description of the preferred embodiments*

Figure 1:
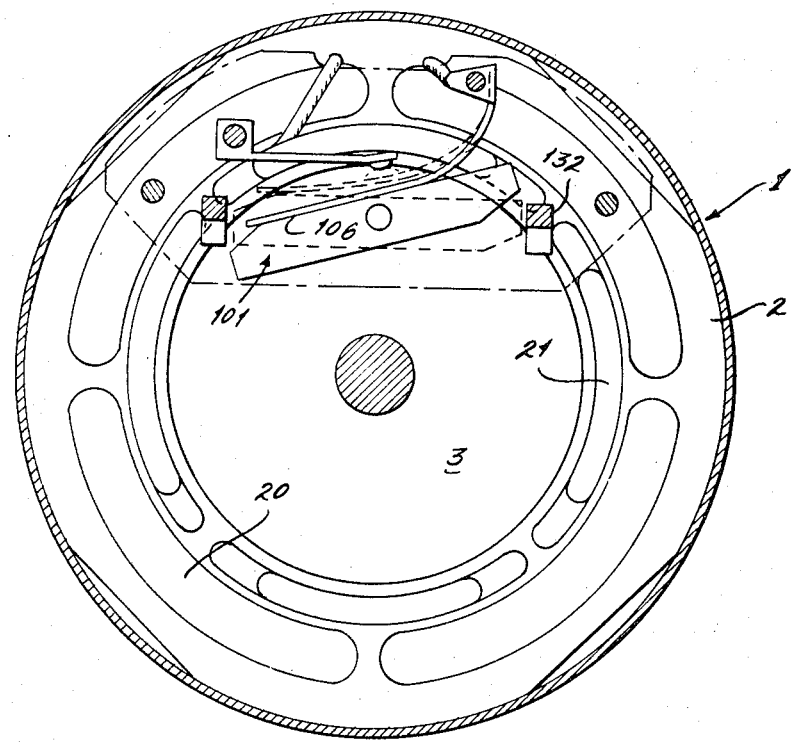
FIGURE 1 is a sectional view taken along the line 1—1 of FIGURE 3, showing one illustrative embodiment of starting device of this invention, mounted in an electric motor.

Referring now to FIGURES 1–4 of the drawings for the illustrative embodiment of motor starting device of this invention there illustrated, reference numeral 1 indicates a split phase or capacitor start motor. The motor 1 has a stator 2, a rotor 3, a stator housing 4, and end shields 5.

The end shields 5 carry a bearing assembly 6, in which a shaft 7, to which the rotor 3 is secured, is journalled.

The stator 2 includes main windings 20 and auxiliary windings 21, and turns 22 and 23 respectively of which project axially beyond the ends of a stator core 25.

A pair of bracket arms 50, integral with one end shield 5, project axially toward the stator core. A panel 105, mounted on the ends of the bracket arms 50, by means of studs 55, forms a part of a starting device 100.

Figure 3:
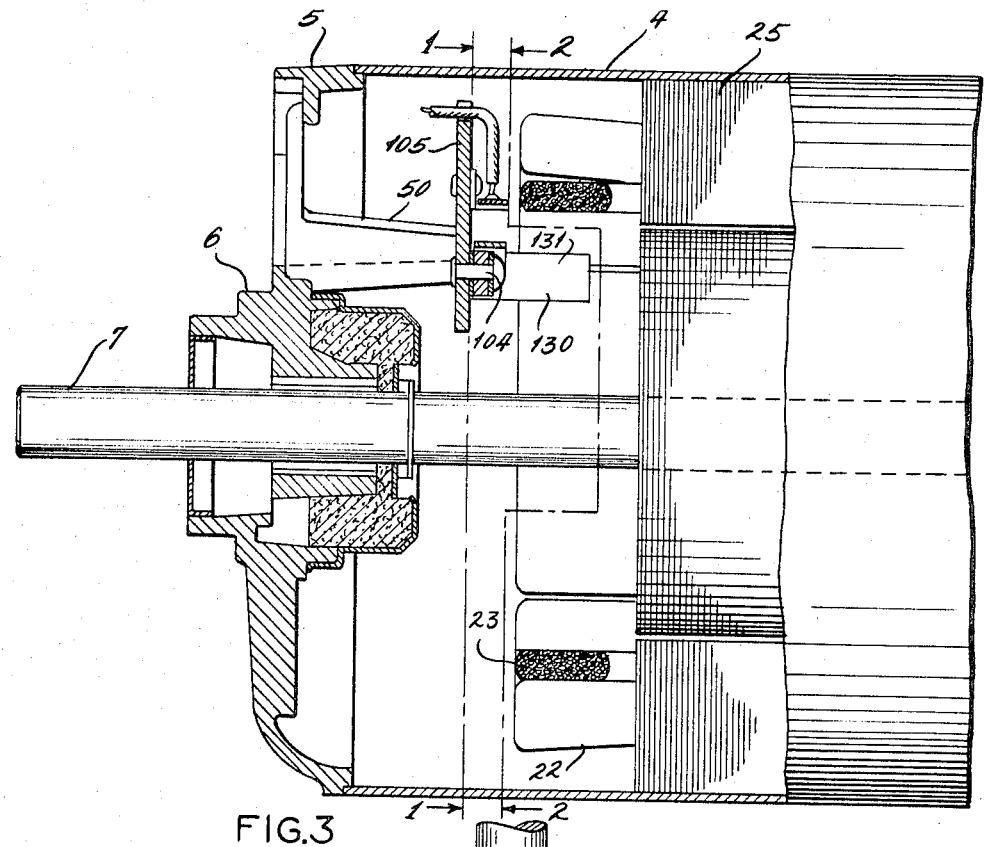
FIGURE 3 is a fragmentary view partly in section and partly in side elevation showing the axial relation of the starting device to the end turns and the rotor and stator of the motor in which it is mounted.
Figure 4:
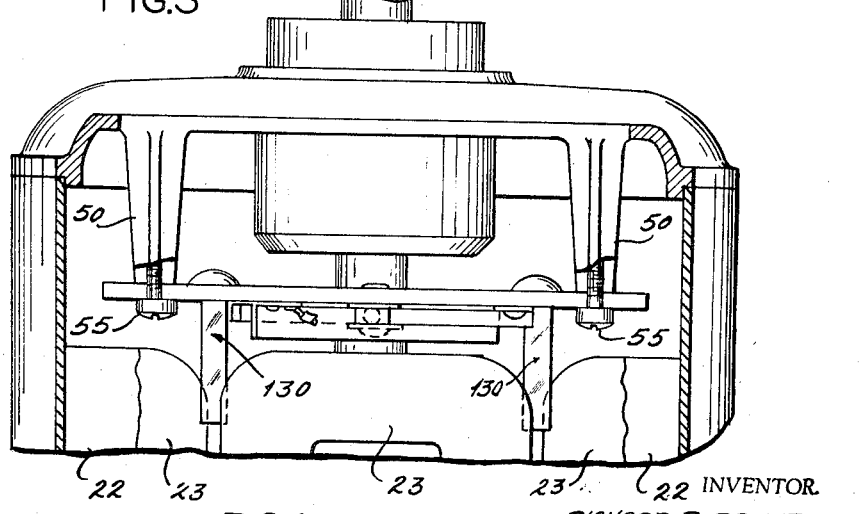
FIGURE 4 is a fragmentary sectional view taken along the line 4—4 of FIGURE 2.

The starting device 100 includes an actuating bar 101, pivotally mounted at its midpoint on the panel 105, by means of a pivot pin 104 as shown in FIGURE 3. Diagonally oposite corners, 102, one on each end of the actuating bar 101, are chamfered to provide short end sections 103 at opposite ends of the bar 101. A long edge wall 107 of the bar 101 provides a bearing surface for a free end section 106 of a spring 110.

One end 111, of the spring 110, is anchored to the panel 105, against movement with respect thereto, by means of a rivet 112, extending through an ear 113 integral with the end 111. The section 106 carries on its surface away from the edge 107 of the actuating bar, an electrical contact 115. The spring 110 itself is made of electrically conductive material, and serves as a conductor.

A complementary electrical contact 125 is carried by the free end of a resilient, electrically conductive finger 120. The finger 120 is anchored to the panel 105 by means of a rivet 122 extending through a tab 123 integral with an end 121 of the finger 120.

Conductor 116 is electrically connected at one end to the ear 113 of the spring 110, and at its other end to the auxiliary windings. Conductor 126 is connected electrically at one end to the tab 123 of the finger 120, and at its other end, mediately or immediately to a primary source of current not here shown.

Flux focusing probes or collectors 130, mounted at one end on the panel 105 and projecting axially inwardly, are spaced from, but closely adjacent the ends 103 of the actuator bar 101. In the illustrative embodiment shown, each of the flux collectors 130 consists of a rectangular body 131, and a square shank portion 132 of an axial length corresponding to the thickness of the panel 105. Between them, shank 132 and body 131 define a shoulder 133, which butts against the face of the plate 105 when the collector 130 is mounted. The shank 132 fits in a square hole in the panel 105, and is headed over at its axially outer end against the panel 105.

The collectors 130 project axially within the circumferential compass of the end wires, and closely adjacent the air gap between the rotor and stator.

Figure 2:
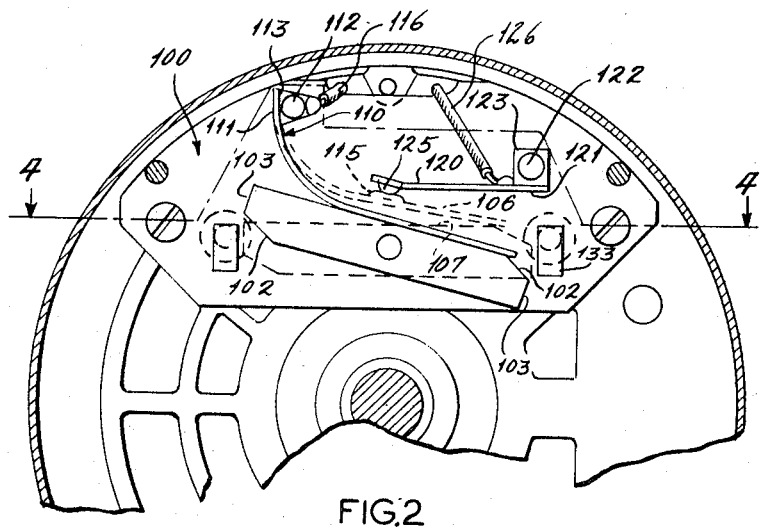
FIGURE 2 is a fragmentary sectional view taken along the line 2—2 of FIGURE 3.

In operation, assuming that the motor is unenergized, and the rotor stopped, the actuator bar 101 will be in a position shown in full lines in FIGURES 1 and 2, and the contacts 115 and 125 will be separated. In this position, the circuit to the auxiliary winding 21 is open.

When current is first supplied main winding 20, a large amount of stray flux between the main winding and the rotor is generated, which apparently sets up a strong magnetic field in the collectors 130, causing the actuator bar 101 to move to the position shown in dotted lines in FIGURES 1 and 2. This brings the contacts 115 and 125 together, closing the circuit to the auxiliary windings 21, and causing the rotor to begin turning.

As the rotor begins to pick up speed, the amount of stray flux diminishes, to the place at which the bias of the spring 110 overcomes the magnetic attraction of the collectors 130, rocking the actuator bar 101 to the position shown in full lines in FIGURES 1 and 2, and opening the circuit to the auxiliary winding 21.

The provision of a balanced, pivoted actuating bar 101 makes the operation of the starting device practically independent of the orientation of the motor. That is to say, the operation of the actuator and the contacts 115 and 125 will be substantially the same in any angular position of the starting device about the shaft, whether the axis of the shaft, hence the motor, be oriented horizontally, vertically, or in some intermediate position.

Referring to FIGURES 5–7 for another embodiment of motor starting device of this invention, reference numeral 202 represents a stator having main windings 220 and auxiliary windings 221, end turns 222 and 223 respectively of which project axially beyond the ends of a stator core.

A starting device 300 includes a pick-up support 335, with wings 336 and a pair of channel defining walls 337.

The pick-up support 335 is firmly wedged between end turns of the main and auxiliary windings prior to the usual dip and bake operations on the stator.

A probe or collector 330 fits snugly into a channel 331 defined by the walls 337 and serves to support a switch case 332 and its contents.

An actuator bar, balanced about a pivot as is the bar in the embodiment shown in FIGURES 1–4, is mounted in the switch case 332, with one end movable to a position closely adjacent an end of the probe 330 extending within the case 332. The actuator bar spring and terminal arrangement of the switch within the case 332 are essentially the same as those in the embodiment shown in FIGURES 1–4.

An actuator bar 301 is pivotally mounted at its midpoint on the switch case 332, by means of a pivot pin 304 as shown in FIGURE 5. A corner 302 of the actuator bar 301 is chamfered to provide a short end section 303 at one end of the bar 301. A long edge wall 307 of the bar 301 provides a bearing surface for a free end section 306 of a spring 310.

One end 311 of the spring 310 is anchored to the switch case 332, against movement with respect thereto, by means of a rivet 312, extending through an ear 313 integral with the end 311. The section 306 carries on its surface away from the edge 307 of the actuating bar, an electrical contact 315. The spring 310 itself is made of electrically conductive material, and serves as a conductor.

A complementary electrical contact 325 is carried by the free end of a resilient, electrically conductive finger 320. The finger 320 is anchored to the switch case 332 by means of a rivet 322 extending through a tab 323 integral with an end 321 of the finger 320.

Conductor 316 is electrically connected at one end to the ear 313 of the spring 310, and at its other end to the auxiliary windings. Conductor 326 is connected electrically at one end to the tab 323 of the finger 320, and at its other end, mediately or immediately to a primary source of current not here shown.

The device shown in FIGURES 5–7 operates in essentially the same way as that shown in FIGURES 1–4. The actuator bar 301 is normally in the position shown in FIGURES 5 and 6. When current is first supplied main winding 220, a large amount of stray flux between the main winding and the rotor is generated, which apparently sets up a strong magnetic field in the collector 330, causing the actuator bar 301 to move toward the collector 330. This brings the contacts 315 and 325 together, closing the circuit to the auxiliary windings 221, and causing the rotor to begin turning.

As the rotor begins to pick up speed, the amount of stray flux diminishes, to the place at which the bias of the spring 310 overcomes the magnetic attraction of the collector 330, rocking the actuator bar 301 to the position shown in FIGURES 5 and 6, and opening the circuit to the auxiliary winding 221.

A third illustrative embodiment of starting device of this invention is shown in FIGURES 8–11. In this embodiment, reference numeral 402 represents a stator having teeth 410 spaced to form slots 411 in which are carried main windings 420 and auxiliary windings 421, end turns 422 and 423 respectively of which project axially beyond the ends of a stator core.

A starting device 500 includes a pick-up support 535, with a pair of legs 536 and a hollow body section 537. The body section 537 and legs 536 define a shoulder 538.

The legs 536 of the pick-up 535 are firmly wedged, radially immediately outboard of the bore, between teeth 410 and the wires of two adjacent auxiliary windings. The shoulder 538 abuts an axially outer end of a tooth 410.

A probe or collector 530 fits snugly into a channel 531 defined by the hollow body section 537 and serves to support a switch case 532 and its contents. The collector 530 is preferably bonded to the body section 537 with an adhesive.

An actuator plate 501, balanced about a pivot rod 504, is mounted in the switch case 532, with one end movable to a position closely adjacent an end of the probe 530 extending within the case 532. The terminal arrangement of the switch within the case 532 is similar to that in the embodiments shown in FIGURES 1–4 and FIGURES 5–7.

The actuator plate 501 is pivotally mounted along its central axis on the switch case 532, by means of the pivot rod 504. On one side of the pivot rod 504 the plate 501 is provided with a yoke 502. Opposing faces 503 of the yoke 502 at the outer end of the yoke 502 flank the collector 530. On the other side of the pivot rod 504 a struck-up ear 507 on the actuator plate 501 provides a bearing point for a free end section 506 of one arm 517 of a hairpin spring 510.

One end 511 of the spring 510 is anchored to the switch case 532, against movement with respect thereto, by means of a slot 512 extending through a wall of the switch case 532. A free end 508 of the other arm 513 of the hairpin spring 510 carries an electrical contact 515. The hairpin spring 510 itself is made of electrically conductive material and serves as a conductor. A dog-leg 514 on the arm 513 provides a point of contact between the arms 517 and 513 of the hairpin spring 510 and separates their free ends 506 and 508.

A complementary electrical contact 525 is carried by the free end of a resilient, electrically conductive finger 520. The finger 520 is anchored to the switch case 532 by means of a slot 522 extending through a side wall of the casing 532. A tab 523 integral with the finger 520 is provided at a secured end 521 of the finger 520.

Conductor 516 is electrically connected at one end to the secured end 511 of the hairpin spring 510, and at its other end to the auxiliary windings. Conductor 526 is connected electrically at one end to the tab 523 of the finger 520, and at its other end, mediately or immediately to a primary source of current not here shown.

Near the secured end 511 of the spring 510 a cam-headed stud 540 threadedly mounted in a boss in the switch case 532 abuts the contact-carrying arm 513 of the spring 510. A second cam-headed stud 541 threadedly mounted in a boss in the switch casing 532 abuts the free end of the finger 520. The studs 540 and 541 allow adjustment of the spacing of the contacts 515 and 525 and the tension on the spring 510.

The device shown in FIGURES 8–11 operates in essentially the same way as those shown in FIGURES 1–4 and FIGURES 5–7. The spring 510 normally biases the faces 503 of the yoke 502 to a position axially (with respect to the motor) outboard of the end of the collector 530. When current is first applied to the main windings 420, a large amount of stray flux between the main winding and the rotor is generated, which apparently sets up a strong magnetic field in the collector 530, causing the yoke 502 to move axially inward toward the collector 530 as shown in FIGURES 8 and 9. This brings the contacts 515 and 525 together, closing the circuit to the auxiliary windings 421, and causing the rotor to begin turning.

As the rotor begins to pick up speed the amount of stray flux diminishes, to the place at which the bias of the spring 510 overcomes the magnetic attraction of the collector 530, rocking the actuator plate 501 to its initial position, and opening the circuit to the auxiliary windings 421.

The cam-headed studs 540 and 541 may be adjusted to give the desired timing for opening the circuit to the auxiliary winding with motors of different sizes.

Numerous variations in the construction of the device of this invention, within the scope of the appended claims, will become apparent to those skilled in the art in the light of the foregoing disclosure.

Having thus described the invention, what is claimed and desired to be secured by Letters Patent is:

1. In an electric motor having a wound stator with slots from which end turns of main winding extend, and a rotating rotor, the improvement comprising a flux collecting probe a first end of which projects closely adjacent but axially spaced from the core of said stator and radially within the compass of said end turns and the other end of which lies axially outward of said first end, and a magnetic piece mounted adjacent said flux collecting probe for movement in response to a magnetic field generated in said probe by said winding when power is first supplied to said winding; biasing means connected to bias said magnetic piece in a direction away from the direction of its movement in response to said magnetic field, said biasing means being of a strength insufficient to prevent the movement of said magnetic piece under initial starting conditions but sufficient to bias the magnetic piece in the opposite direction under running condition and electrical contact means operatively associated with said magnetic piece to move between circuit making and circuit breaking positions with movement of said magnetic piece.

2. The motor of claim 1 wherein the stator contains starting and running windings, and said contact means comprise switch means connected to be moved into starting winding energizing position by movement of said magnetic piece in response to said magnetic field and to starting winding de-energizing position by the biasing means.

3. In an electric motor having a rotor and a wound stator from an axial end of which stator coils project, the improvement comprising two flux focusing probes, each extending from a point axially near the air gap between the stator and rotor but axially spaced therefrom to a point axially beyond the projecting main stator coils, each of said probes being positioned circumferentially within the span of a different coil, a magnetic piece pivotally mounted beyond the axial reach of said coils, between said probes, said magnetic piece having parts, oppositely disposed with respect to the pivot point, each adapted to be drawn toward one of said probes in response to a strong magnetic field at said probes produced by the end turns of the said main stator coils, electrical contact means operatively associated with said magnetic piece to move between circuit making and circuit breaking positions for the starting winding with movement of said magnetic piece and biasing means connected to bias the said parts of said magnetic piece in a direction away from their respective probes.

4. The improvement of claim 3 wherein the biasing means and electrical contact means comprise a spring bearing on said magnetic piece, said spring being electrically conductive, and carrying an electrical contact point; a fixed electrical contact is provided normally out of electrical contact with the spring carried contact point, said spring being so positioned and arranged with respect to said magnetic piece and fixed contact point that movement of said magnetic piece in response to a magnetic field in said flux focusing probes, causes said contact points to meet.

5. In an electric motor having a wound stator with a radial face and slots from which end turns of main winding and starting windings extend, and a rotating rotor, the improvement comprising a flux collecting probe projecting axially closely adjacent but spaced axially from the radial face of the stator and radially within the compass of said end turns, and a magnetic piece mounted adjacent said flux collecting probe for movement in response to a magnetic field generated in said probe by magnetic flux produced by said main winding end turns under starting conditions; biasing means connected to bias said magnetic piece in a direction away from the direction of its movement in response to said magnetic field and of a biasing strength insufficient to prevent the movement of said magnetic piece under initial starting conditions but sufficient to bias the magnetic piece in the opposite direction under rotor running conditions, and electrical contact means operatively associated with said magnetic piece to move between circuit making position when said magnetic piece moves in response to said magnetic field and circuit breaking position when said magnetic piece is moved by said biasing means in the opposite direction to energize and deenergize respectively the starting winding.

6. The improvement of claim 5 wherein the magnetic piece is in the form of an elongated bar, pivoted on an axis substantially parallel to the axis of the probe to rotate toward and away from the said probe and positioned with one end in close proximity to said probe but spaced therefrom.

7. The improvement of claim 5 wherein the magnetic piece is in the form of an actuator plate pivoted on an axis in a plane substantially perpendicular to the axis of the probe to rotate toward and away from said probe and having a part in close proximity to said probe but spaced laterally therefrom.

8. The improvement of claim 7 wherein the said part of the actuator plate is in the form of a yoke having two, opposing faces, one on either side of the probe.

9. The improvement of claim 7 wherein the actuator plate is provided with an ear, and a spring, carrying one of the electrical contact means, is positioned to be moved, by said ear, into electrical contact with another electrical contact means, in response to pivoting of the plate about said pivot axis under starting conditions.

10. The improvement of claim 5 wherein the probe is seated in a pick-up support mounted between the said end turns.

11. The improvement of claim 10 wherein the pick-up support has legs adapted to fit between slot-defining teeth of the stator and windings in said slots, and a probe-receiving body section straddling at least one tooth when said legs are mounted to extend axially into spaced slots from an end of the stator.

References Cited
UNITED STATES PATENTS

| | | | |
|---|---|---|---|
| 2,139,531 | 12/1938 | Wedge | 318—221 |
| 2,411,625 | 11/1946 | Vuhas | 318—221 |
| 2,511,797 | 6/1950 | Portella | 318—221 |
| 2,541,683 | 2/1951 | Attridge | 318—221 |
| 3,080,694 | 3/1963 | Lundin | 310—68 |

J. D. MILLER, *Primary Examiner.*

U.S. Cl. X.R.

318—221; 310—41, 66

UNITED STATES PATENT OFFICE
CERTIFICATE OF CORRECTION

Patent No. 3,423,612　　　　　　　　　　　　　　　　　　　　　January 21, 1969

Richard B. Brundage

It is certified that error appears in the above identified patent and that said Letters Patent are hereby corrected as shown below:

Column 1, line 37, "May 20, 1065" should read -- May 20, 1965 --. Column 2, line 15, "it speed and load" should read -- its speed and load --. Column 3, line 30, "and turns" should read -- end turns --. Column 8, line 36, "2,411,625", "11/1946" and "Vuhas" should read -- 2,411,405 --, --11/1946 -- and -- Yuhas --; line 37, "2,511,797" should read -- 2,511,799 --; line 39, "3,080,694" should read -- 3,080,494 --.

Signed and sealed this 24th day of March 1970.

(SEAL)
Attest:

Edward M. Fletcher, Jr.　　　　　　　　　　WILLIAM E. SCHUYLER, JR.
Attesting Officer　　　　　　　　　　　　　　　　Commissioner of Patents